United States Patent [19]

Lum

[11] Patent Number: 5,479,594
[45] Date of Patent: Dec. 26, 1995

[54] DIGITAL COLOR VIDEO IMAGE ENHANCEMENT FOR A DIFFUSION DITHER CIRCUIT

[75] Inventor: Sanford S. Lum, Scarborough, Canada

[73] Assignee: ATI Technologies Inc., Canada

[21] Appl. No.: 118,634

[22] Filed: Sep. 10, 1993

[51] Int. Cl.⁶ .................................................. G06F 15/00
[52] U.S. Cl. ......................................................... 395/143
[58] Field of Search .................................. 395/142, 141, 395/143; 358/518; 345/135, 136; 364/745

[56] References Cited

U.S. PATENT DOCUMENTS

| | | | |
|---|---|---|---|
| 5,134,688 | 7/1992 | Corthout | 395/142 |
| 5,175,807 | 12/1992 | Cawley et al. | 395/128 |
| 5,251,298 | 10/1993 | Nally | 395/166 |
| 5,293,258 | 3/1994 | Dattilo | 358/518 |

*Primary Examiner*—Phu K. Nguyen
*Attorney, Agent, or Firm*—Pascal & Associates

[57] ABSTRACT

Enhancing each pixel of a digital color video image by, for each component part of a source pixel, successively adding a truncation error of an immediately preceding previous pixel in an X direction to a current pixel. A resulting value is truncated to form a truncation error and most significant bits, and the most significant bits are provided to a destination line.

5 Claims, 2 Drawing Sheets

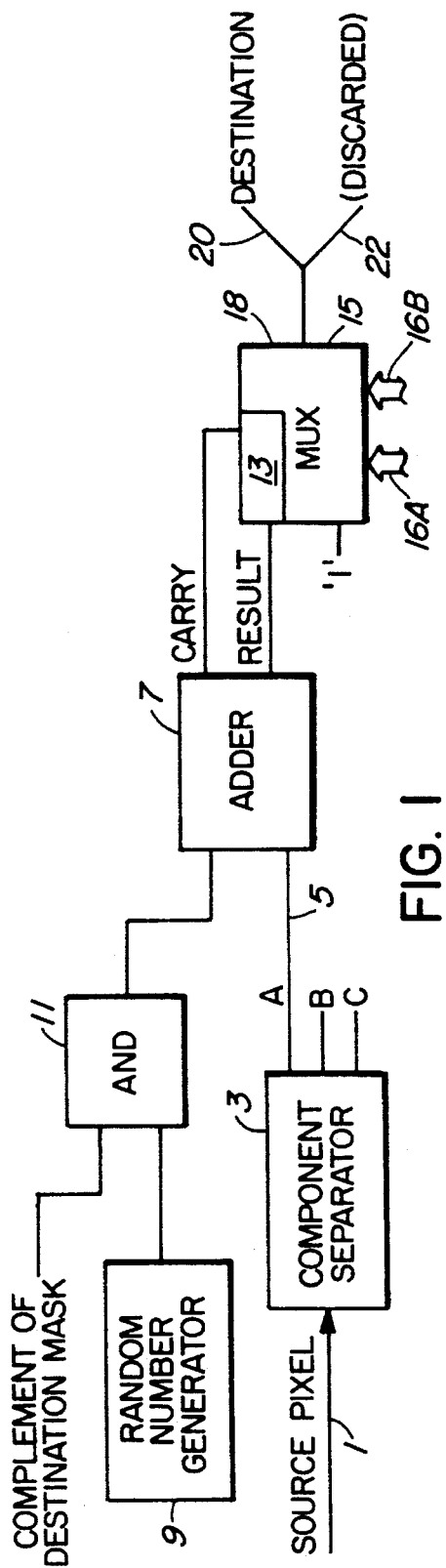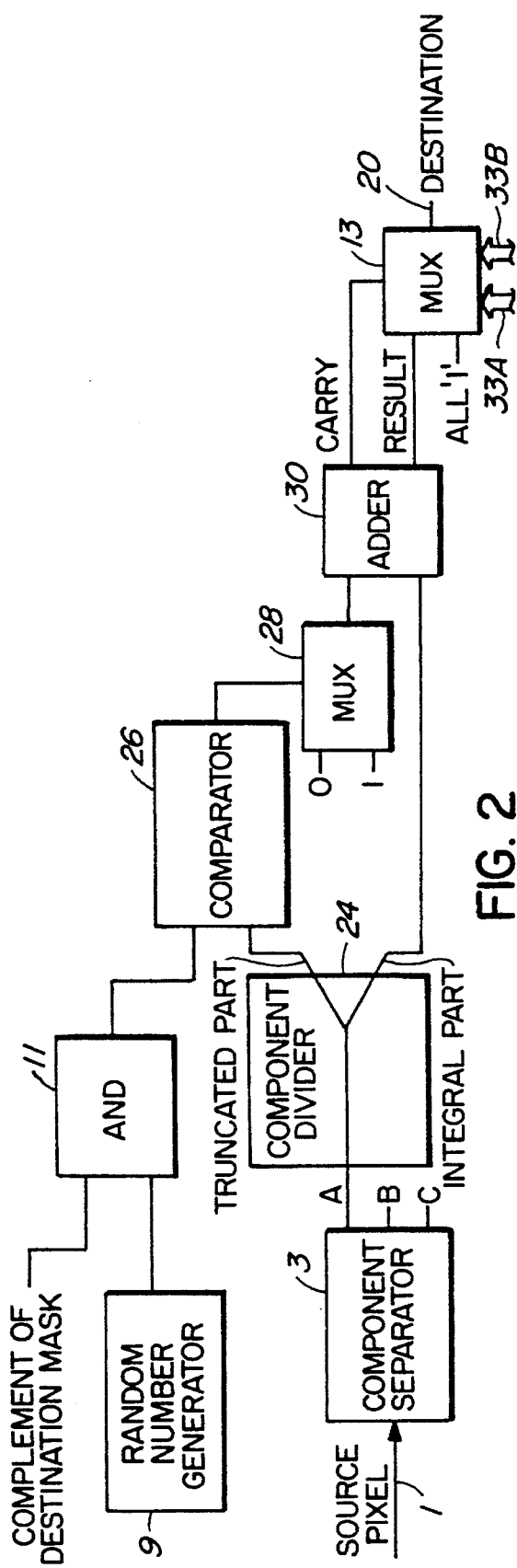

DIGITAL COLOR VIDEO IMAGE ENHANCEMENT FOR A DIFFUSION DITHER CIRCUIT

FIELD OF THE INVENTION

This invention relates to methods of enhancing digital video images, particularly in digital computers.

BACKGROUND TO THE INVENTION

Digital computers which process multi-media signals comprised of moving video images, graphics, etc. require the capability to display such images on 8 bit per pixel (256 color) pseudo color displays.

Currently there are several ways in which this can be accomplished:

(a) The 256 most common colors in the image are chosen, and a color palette is set appropriately. Each pixel is remapped to the closest color in the palette. This has worked quite well except when there have been multiple images on the screen or when animating the image or any time that there is an even color distribution. For animation, the entire procedure must be performed for each frame and requires much preprocessing and run time processing, which results in an unacceptably low frame rate.

(b) All colors are truncated or rounded to a normalized RGB 3:3:2 display. Picture quality using this method has been found to be very poor. Bands occur on color boundaries and subtle features in the image are lost. This method does not work very well on digitized video images.

(c) Resolution is traded off for color accuracy, in a procedure referred to as ordered dithering. The entire image is subdivided into 2×2 pixel areas, and the average color is computed for each area. The two colors within the 256 color palette that are closest to the average color are chosen. The closeness of each color to the average color determines the ratio (0%, 25%, 50%, 75% or 100%) of the colors to use. The perceived correctness of the colors is very good, but the resulting image has only ¼ of the original spatial resolution, and color bands occur on some color boundaries. The picture quality is between the quality achieved in methods (a) and (b) noted above.

SUMMARY OF THE PRESENT INVENTION

I have invented improved methods for enhancing digital color video image as follows.

(i) In a procedure I refer to as diffusion dithering, which is the subject of the present invention, the truncation error of a pixel is added to the next pixel to be processed. This preserves subtle image details. This one dimensional dithering produces medium to high quality video images, although it appears to leave artifacts on vertical color boundaries.

(ii) In a procedure I refer to as random dithering, low level white noise is injected into the video signal so that pixel components are probabilistically truncated to the nearest value. Medium to high quality video images are produced in which subtle image details are preserved, although the signal to noise ratio drops to some degree.

Both diffusion dithering and random dithering methods impose only low computation overheads.

Using random dithering, I have found that subtle detail is preserved at low pixel depths. For still images, average color error is reduced compared to straight truncation. Compared to other methods, the average color error is high, but the perceived color error is lower, because human visual perception integrates the pixel color with pixels nearby, and pixels in small regions are statistically closer to the average color. For animated images, the perceived color error has been found to be even lower because the pixel colors are averaged in time as well.

Indeed, using a pipeline pixel processor data path as will be described below, there is no computational overhead in the computer microprocessor. The gate count of the processor is very low.

Drawbacks to the random dithering method are a slight increase in signal noise ratio, and it will not work in true pseudo color mode in which a lookup table entry contains an arbitrary color. Additionally, reading back randomly dithered data will yield inconsistent results where a solid color previously existed, for obvious reasons. Because of this, run-length compression techniques should only be performed on an original source data and not on randomly dithered data.

Using the diffusion dithering method described herein, subtle detail is preserved at low pixel depths. Only low color error is perceived. As with random dithering, there is no microprocessor computational overhead due to the preferred use of a pipeline pixel processor, and there is a low gate count for at least the scanning line diffusion dithering case.

On the other hand, it has been found that diffusion dithering is better when processing digitized video images than drawn images, and artifacts are noticeable at vertical color boundaries for the one dimensional (line scan) method. The two dimensional image (x and y) diffusion dithering method results in a significant gate count for a pixel processor. The signal is more difficult to compress, and as in the random dithering method, it will not work in true pseudo color modes in which a lookup table entry contains an arbitrary color.

In accordance with an embodiment of the invention, a method of enhancing a digital color video image is comprised of (a) receiving a pixel component in a scan line and truncating it to obtain a truncation error, (b) temporarily saving the truncation error, (c) receiving a next pixel in the scan line, and adding the truncation error to that next pixel to obtain a resultant pixel, (d) truncating the resultant pixel to obtain another truncation error, (e) temporarily saving the latter truncation error, (f) repeating the steps (c) and (d) progressively for substantially each pixel in the scan line, and (g) repeating the steps (a)–(f) for substantially all scan lines in the image.

In accordance with another embodiment, a method of enhancing a digital color video image is comprised of for each component part of a source pixel, successively adding a truncation error of an immediately preceding previous pixel in an X direction to a current pixel, truncating a resulting value from the addition to form a truncation error and most significant bits, and providing the most significant bits to a destination line.

In accordance with another embodiment, a method of enhancing a digital color video image is comprised of (a) receiving a pixel component of a scan line and truncating it to obtain a truncation error, (b) temporarily saving one-half of the truncation error, (c) receiving a following next pixel of the scan line and adding the one-half of the truncation error thereto and one-half the truncation error of an adjacent pixel from a previous line, if any, to form an adjusting next pixel, (d) truncating the adjusted next pixel to obtain another truncation error, (e) repeating steps (c) and (d) progressively for substantially each pixel in the scan line, (f) repeating steps (a)–(e) for substantially all scan lines in the image.

BRIEF INTRODUCTION TO THE DRAWINGS

A better understanding of the invention will be obtained by reference to the detailed description below, in conjunction with the following drawings, in which:

FIGS. 1 and 2 are block diagrams of apparatus that can be used as pipeline pixel processors for implementing random dithering, and FIGS. 3 and 4 are block diagrams of apparatus that can be used as pipeline pixel processors for implementing diffusion dithering.

DETAILED DESCRIPTION OF THE INVENTION

Figure 3:
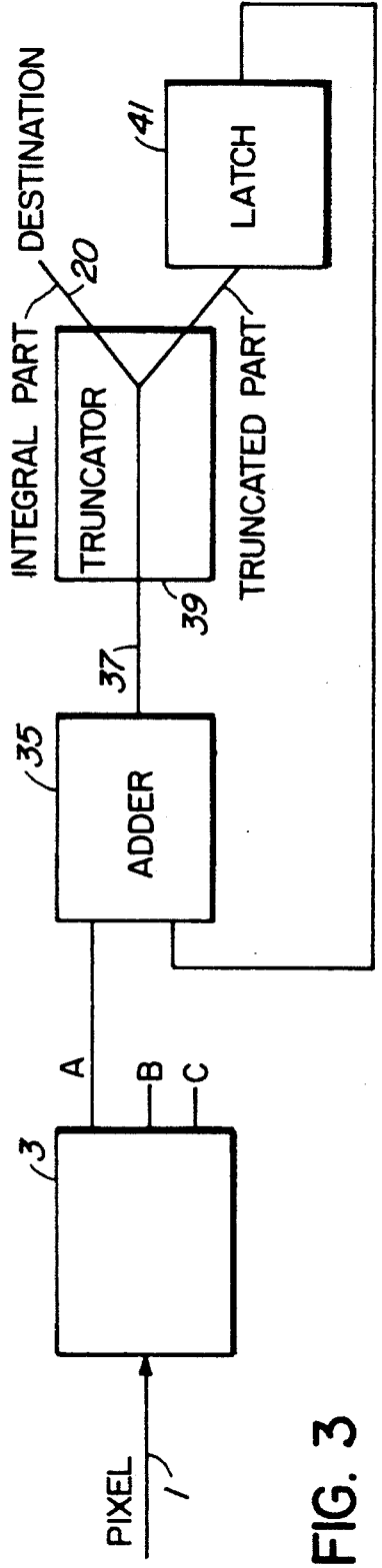

Digital video data typically is presented in a particular color format, such as RGB (component parts of red, green and blue intensities), YUV (component parts of luminance and two chroma vectors), CYMK, etc. In a computer which is to process the video signal, the original source data is typically wide video data (for example, 24 bits presented in RGB 8:8:8 form, that is 8 bits designating the intensity of each of the three colors), and the target destination is narrow (typically 8 or 16 bits usually presented in RGB 3:3:2 or 5:6:5 form). Thus it may be seen that a video source with high color resolution (256 levels per component part) is typically converted to a destination of low color resolution, i.e. having larger increments between digital levels. Since the digital level increments are larger in the destination, more detail is lost from the original image than is caused by the digital increments from the source.

In accordance with random dithering, a source pixel is separated into its individual component parts, e.g. the R, G and B parts, or the Y, U, V parts, or the C, M, Y and K parts, etc. For each component part, a random number is generated that has the same length as the component part.

Preferably for each component part, the random number is masked with the complement of a destination mask. The destination mask has ones set for all bits which eventually will reach the destination. For example, the destination mask for an 8:8:8 to RGB 3:3:2 destination is 11100000:11100000:11000000. The complement is 00011111:00011111:00111111.

For each component part, each random number is added to its respective source pixel with saturation. "With saturation" means that if the addition generates a carry, the result should be forced to the maximum value that the source pixel component length permits, i.e. all 1's. For example, the saturation value for an 8 bit source pixel component is 255.

For each component part the resultant number is then truncated to the destination component length. The pixel components are then combined and written to a destination.

In accordance with another embodiment, the source pixel is separated into its component parts. Each of the component parts is divided into two parts, an integral part, which includes the most significant bits which will eventually propagate to a destination, and a truncated part, which will eventually be discarded.

For each component part, a random number is generated with the same bit length as the truncated part. For each component part, if the random number is less than the truncated part, a "1" is added with saturation to the integral part. The integral parts of the pixel components are then combined and are written to the destination.

For the diffusion dithering invention, when decimating any information signal to the lower resolution, the small signal information that is lost is contained within the truncation error. For video signals, pixels have been found to be generally very close in value in any small spatial region (the same is not true for drawn images). Therefore small signal information may be preserved by accumulating the truncation error of a given pixel and distributing its energy amongst its adjacent pixels before they are truncated.

In the one dimensional case, e.g. for dithering in the line scan direction, the diffusion process proceeds in a single direction and accumulates the truncation error in a forward direction. This is repeated for each scan line of an image.

In the two dimensional case, the diffuser distributes truncation error in both the forward X and Y directions. Half the truncation error of any given scan line is saved, e.g. in a line buffer for application to the next scan line.

Thus to implement diffusion dithering in accordance with the first diffusion dithering embodiment, a pixel is received and truncated, the truncation error being saved. The following pixel is received and the saved truncation error is added to it. The result pixel value is truncated and the truncation error is saved.

The steps of receiving the following pixel and adding the saved truncation error to it, truncating the result and saving the truncation error is repeated for the remainder of the scan line, and the entire method is repeated for each scan line in succession.

For the second embodiment of diffusion dithering, a first pixel is received and truncated. One-half of the truncation error is saved in a line buffer. The following pixel is received and one-half of the truncation error, e.g. as saved in the line buffer is added to it. In addition, one-half of the truncation error of the adjacent pixel of the previous line, if any, is added. This effectively adds the truncation error in both the X and Y directions to a current pixel.

The resulting pixel value is truncated, and one-half of this value is saved, e.g. in the line buffer. The steps of obtaining the next pixel, adding half of the truncation error of the previous pixel and of the adjacent pixel of the previous line, truncating it and saving one-half of the truncation error is repeated for each pixel in the scan line, and the entire method is repeated for all scan lines.

The apparatus of FIG. 1 can be used to implement the first embodiment of the random dithering method. A source pixel is received on line 1, and the component parts of the source pixel are separated in the component separator 3, which separate components are respectively output on lines A, B, C, etc. Thus, for example, for the RGB color model, the components are red, green and blue; for the YUV color model the component parts are luminance and two chroma vectors.

In order to avoid redundancy, the following description will be directed to the processing of a single color component, but it will be recognized that each of the color components is processed by similar apparatus. It should be noted that by the use of the word "lines" which carry data signals is meant lines or multi-line buses.

The color component from the component separator 3 is applied via line 5 to adder 7.

A random number generator 9 generates random numbers and applies them to AND gate 11. Also input to AND gate 11 is the complement of a destination mask. A destination mask hs all "1's" set for all bits which will eventually reach the destination. For example, a destination mask for an RGB 8:8:8 to RGB 3:3:2 destination (higher to lower resolution)

is 11100000:11100000:11000000. The complement of the destination mask is 0001111:0001111:0011111.

The output of the AND gate thus is the random number masked with the complement of the destination mask, which is applied to the input of the adder 7 for adding to the component part of the pixel appearing on line 5.

The masked random number is added to the respective source pixel component part is adder 7 "with saturation". "With saturation" means that if the add generates a carry, the result is forced to a maximum value that the source pixel component length permits, i.e. all "1's". For example, the saturation value for an 8 bit source pixel component is 255.

For each component part, the resultant number can be truncated to the destination component length in truncator 13, which can be simply a register or pair of registers.

The processed other pixel components are applied, via lines 16A and 16B, with the result and carry outputs of adder 7, to multiplexer 18. The output signal of multiplexer 18 is a destination pixel for an application destination line 20.

Rather than truncating each signal in truncator 13, the line 20 can carry a predetermined number of most significant bits, and the least significant bits can be discarded as represented by discarded bits line 22, which in effect performs the truncation to the destination component length.

In summary, therefore, a random number is ANDed with the complement of a destination mask. This number is added to the source pixel component separated in component separator 1. If the carry bit is set, the multiplexer output is all "1's". Otherwise the multiplexer output is the result of the add function. The most significant bits as determined by the destination pixel component parts are combined with those of the other component parts and all other bits are discarded.

FIG. 2 illustrates a block diagram for implementing a second embodiment of the random dithering method. As in the previous embodiment, a source pixel 1 is separated into component parts in component separator 3. Also as in the embodiment of FIG. 1, a random number generator 9 generates a random number and applies it to AND gate 11, to which the complement of a destination mask is also applied for ANDing therewith.

The source pixel component part is divided into two parts into component divider 24, an integral part and a truncated part, the latter of which will eventually be discarded. The integral part has the most significant bits, which will eventually propagate to the destination. The truncated part of the source pixel component is compared in comparator 26 with the masked random number output from AND gate 11 which has the same bit length as the truncated part. A decision signal is output from comparator 26, of whether or not the random number is less than the truncated part.

The decision signal output of comparator 26 is applied to control input of multiplexer 28, which multiplexer has two inputs, respectively receiving a "0" and a "1". Under control of the output signal of comparator 26, the output of multiplexer 28 is a "1", with saturation, if the random number is less than the truncated part; otherwise it is a "0". The "0" or "1" with saturation, is applied to adder 30, to which the integral part of the component part of the source pixel is applied. The "1" with saturation or the "0" is thus added to the integral part of the component part of the source pixel.

The output of adder 30 is applied to multiplexer 13, to which the outputs of corresponding adders 30 which process the other component parts are applied via lines 33A and 33B. The signals corresponding to the various processed components are combined in multiplexer 13 and are written to a destination via a destination line 20.

For both of the embodiments noted above, if the operating trajectory is proceeding in an X direction, the random number repeat length should be chosen such that it is not a multiple and is not close to a multiple of the image width. This will avoid visible artifacts on the image resulting from the pseudo-random repeating sequence. For a Y direction, the random number repeat length should not be near the image height.

Each embodiment has the effect of rounding the pixel component up or down, according to the probability determined by the component's closeness to the possible high and low results. For three component part pixels, this yields eight possible resultant colors that may be written to the destination.

FIG. 3 illustrates the structure on which the invention for diffusion dithering along a pixel line may be implemented.

A pixel is received on line 1 and is separated into component parts in component separator 3. A component part passes through adder 35 and is output on line 37. It passes into truncator 39, which can be either a register or, if carried on parallel data lines, can be truncated by merely separating the most significant from the least significant bits. The least significant bits constitute a truncation error, which is stored in latch 41. The most significant bits are output on destination line 20.

The output of latch 41, the truncation error, is added in adder 35 to the component part of the next pixel which has been received on line 1 and has been separated in separator 3. Thus the output of adder 35 on line 37 is the sum of the following pixel with the truncation error of the previous pixel. This signal is truncated in truncator 39 or the equivalent, with the truncated part, constituting the truncation error, being stored in latch 41, while the integral part is passed via destination line 20 to a destination.

These steps are continued for each pixel in a scanning line to the end of a scanning line. The process is started again for the first pixel of the next scanning line and proceeds for each scanning line of the image. The latch should be cleared at the end of each scanning line so that the last pixel of the preceding scanning line does not affect the first pixel of the following scanning line.

The component parts carried on each of the destination lines 20 are combined (not shown in FIG. 3) to form a destination pixel, which combining can be done in a multiplexer.

Figure 4:
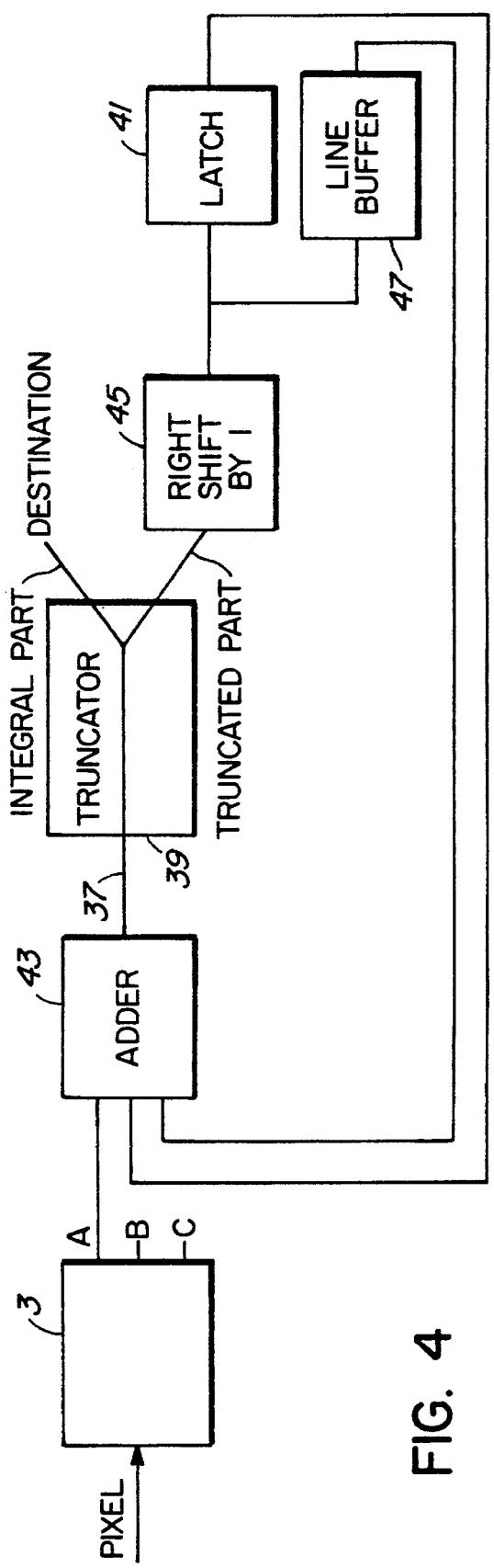

FIG. 4 illustrates a block diagram for implementing diffusion dithering in the two orthogonal X and Y directions of an image. Pixel component parts are separated as described earlier in component separator 3. A component part is applied to an input of an adder 43.

An output signal of adder 43 is carried by line 37 to truncator 39, which operates as described above with respect to FIG. 3, generating an integral part (the most significant bits) and a truncation error, which is the truncated part. The truncated part is applied to a right shifter 45, where it is right shifted by one, thereby dividing it in half. This data is stored both in latch 41 and in a line buffer 47.

The next pixel is received in component part separator 3 and is separated, a component part being applied to adder 43 like the preceding pixel. The one-half of the truncation error of the previous pixel, stored in latch 41, is applied to adder 43, as described above with regard to the embodiment of FIG. 3. However in addition, one-half of the truncated error of the adjacent pixel from the previous line stored in line buffer 43 is also added to the pixel component part in adder 43. The result on line 37 is the sum of the truncation error from the previous pixel in both X and Y directions.

This pixel value on line 37 is then truncated as described above, and one-half of the truncation error is stored in latch 41 and in line buffer 47. The entire process repeats for each pixel in the scan line and for each line of the image.

Thus the truncation error is divided equally for accumulation with the pixels in both the X and Y directions. The latch 41 should be zeroed at the beginning of each scan line and the line buffer 47 should be zeroed before the image processing begins and at the beginning of each frame.

It should be noted that random dithering is very applicable in the case of RGB 8:8:8 direct color to any 16 bit RGB direct color mode, RGB 8:8:8 direct color to RGB 3:3:2 pseudo color or any 16 bit RGB direct color mode to RGB 3:3:2 pseudo color.

A problem arises when the destination component parts are unequal in size; the maximum value of each color component then is different when displayed. This occurs because the color representation within most digital to analog color converters is wider than the color stored in screen memory of the computer. 8 bit pseudo color modes index an internal lookup table of the 256 physical colors, and the physical colors may be 18 or 24 bit wide. In the case of 16 bit per pixel direct color modes, these zero extended to a full 24 bits within most digital to analog converters. Therefore in RGB 3:3:2 mode, the maximum value for the R and G components is 11100000=224, and the maximum value for the B component is 11000000=192. Bright colors will result in erroneous display of colors because blue saturates much sooner than the red and green components. This is especially true for bright white.

If the target mode is a pseudo color mode, the color lookup table in the digital to analog converter can be adjusted such that there is even spacing between color levels of each component. Each component should be recursively shifted right by the target component width and the result ORed with itself. The RGB 3:3:2 color lookup table adjustments are generated with the equations below (in C notation):

$$R_8 = R_3 | (R_3 >> 3) | (R_3 >> 6)$$

$$G_8 = G_3 | (G_3 >> 3) | (G_3 >> 6)$$

$$B_8 = B_2 | (B_2 >> 2) | (R_2 >> 4) | (B_2 >> 6)$$

For RGB 5:6:5 the equations are:

$$R_8 = R_5 | (R_5 >> 5)$$

$$G_8 = G_6 | (R_6 >> 6)$$

$$B_8 = B_5 | (B_5 >> 5)$$

Since 16 bit per pixel modes in most digital to analog converters are direct color modes and have no color lookup table, a special digital to analog converter should be used which performs a bit extension similar to the equation above, for correction. However the effects of saturation error are not immediately visibly apparent at the 5th and 6th bit position.

A person understanding this invention may now conceive of alternative structures and embodiments or variations of the above. All of those which fall within the scope of the claims appended hereto are considered to be part of the present invention.

I claim:

1. A method of enhancing a digital color video image comprising:
    (a) receiving a pixel component in a scan line and truncating the pixel component to obtain a truncation error,
    (b) temporarily saving the truncation error,
    (c) receiving a component of a next pixel in the scan line and adding the truncation error to that next pixel component to obtain a resultant pixel component,
    (d) truncating said resultant pixel component to obtain another truncation error,
    (e) temporarily saving the latter truncation error,
    (f) repeating steps (c), (d) and (e) progressively for substantially each pixel component in the scan line, and
    (g) repeating steps (a)–(f) for substantially all scan lines in the image.

2. A method of enhancing a digital color video image comprising, for each component part of a source pixel, successively adding a truncation error of an immediately preceding previous pixel component, other than a first preceding previous pixel, in an X direction to a current pixel component, truncating a resulting value to form a truncation error and most significant bits, and providing the most significant bits to a destination line 3. A method as defined in claim 2 including combining said most significant bits of all component part bits on corresponding destination lines.

4. A method as defined in claim 2 in which the truncation error is divided by half before adding it to a current pixel component and storing a resulting half error in a line buffer, and adding a stored one-half truncation error relating to an immediately adjacent pixel component of an immediately preceding line to the current pixel component in the adding step.

5. A method of enhancing a digital color video image comprising:
    (a) receiving a pixel component of a scan line and truncating the pixel component to obtain a truncation error,
    (b) temporarily saving one-half of the truncation error,
    (c) receiving a following next pixel component of the scan line and adding said one-half the truncation error thereto and one-half the truncation error of an adjacent pixel component from a previous line, if any, to form an adjusted next pixel component,
    (d) truncating said adjusted next pixel component to obtain another truncation error,
    (e) repeating steps (c) and (d) progressively for substantially each corresponding component pixel in the scan line,
    (f) repeating steps (a)–(e) for substantially all scan lines in the image.

* * * * *